(12) United States Patent
Bao

(10) Patent No.: US 11,418,045 B2
(45) Date of Patent: Aug. 16, 2022

(54) PORTABLE INTELLIGENT CHARGER

(71) Applicant: NINGBO YOUWELL AUTOPARTS TECHNOLOGY CO., LTD., Cixi (CN)

(72) Inventor: Yibo Bao, Cixi (CN)

(73) Assignee: NINGBO YOUWELL AUTOPARTS TECHNOLOGY CO.. LTD., Cixi (CN)

( * ) Notice: Subject to any disclaimer, the term of this patent is extended or adjusted under 35 U.S.C. 154(b) by 220 days.

(21) Appl. No.: 16/581,119

(22) Filed: Sep. 24, 2019

(65) Prior Publication Data

US 2021/0091580 A1    Mar. 25, 2021

(51) Int. Cl.
*H02J 7/00* (2006.01)
*H02G 11/02* (2006.01)
*H02J 7/34* (2006.01)
*B60L 53/18* (2019.01)
*B60L 53/16* (2019.01)

(52) U.S. Cl.
CPC ............ *H02J 7/0045* (2013.01); *H02G 11/02* (2013.01); *B60L 53/16* (2019.02); *B60L 53/18* (2019.02); *B60Y 2200/91* (2013.01); *B60Y 2300/91* (2013.01); *H02J 7/345* (2013.01)

(58) Field of Classification Search
None
See application file for complete search history.

(56) References Cited

U.S. PATENT DOCUMENTS

| 2011/0149455 A1* | 6/2011 | Ueno | B60L 53/31 361/87 |
| 2011/0169447 A1* | 7/2011 | Brown | B60L 53/16 320/109 |

* cited by examiner

*Primary Examiner* — Arun C Williams
(74) *Attorney, Agent, or Firm* — Yee & Associates, P.C.

(57) ABSTRACT

A portable charger, relating to the field of electric vehicle and having a body comprising a shell, a connecting system and a controller, wherein the controller is arranged inside the shell, the connecting system is arranged on both sides of the shell, a cable placing ring is formed on the side wall of the shell, one side of the cable placing ring is provided with a hook, by arranging the cable placing ring and the hook, cables are twined along the contour of the cable placing ring and placed in the cable placing ring, after the cables are retracted and twined, the cable of the uppermost layer is snap-fitted in the hook, thereby fixing the cables, having simple structure, and reducing the overall occupied space of the charger.

7 Claims, 4 Drawing Sheets

PORTABLE INTELLIGENT CHARGER

TECHNICAL FIELD

The present invention relates to the field of electric vehicles, and particularly to a portable intelligent charger.

BACKGROUND

Under the background that our country strongly supports the development of new energy industry, as an important part of the new energy industry, a pure electric vehicle plays an important role. At present, each electric vehicle is standard equipped with an electric vehicle charger. However, for various power supply devices, including chargers, on the existing market, because cables are messy and are easy to twine with each other and are easy to loosen after the retraction, repeated retraction and cumbersome retraction process are caused, and the problems that cables are internally broken and a large storage space is occupied are caused because cables are folded and retracted, bringing a lot of inconvenience to consumers.

SUMMARY

To solve the above technical problem, the purpose of the present invention is to provide a portable intelligent charger facilitating cables to be twined and fixed, reducing the space occupied by the charger.

To achieve the above purpose, the present invention adopts the following technical solution: a portable intelligent charger, having a body provided with a shell, wherein the side wall of the shell is provided with a cable placing ring, and one side of the cable placing ring is provided with a hook.

By adopting the above technical solution, by providing the cable placing ring on the shell of the charger, cables in the connecting system of the charger are placed in the cable placing ring, and in combination with the hook provided at one side of the cable placing ring, the cables are fixed, thereby reducing the space occupied by the charger.

Preferably, the side wall of the shell is provided with a placing cover, and the placing cover directly faces the cable placing ring.

By adopting the above technical solution, the placing cover directly faces a charging gun of the connecting system, facilitating placement of the charging gun and having an effect of protecting the charging gun.

Preferably, one side of the placing cover is provided with a connecting piece, and the placing cover is slidably connected to the shell by the connecting piece.

By adopting the above technical solution, the connecting piece achieves the sliding connection between the placing cover and the shell, solving the problem that the charging gun and the placing cover cannot be completely fastened due to the fact that pulling forces on the cables are different in the process of twining the cables.

Preferably, the bottom surface of the shell is provided with a sucking disk.

By adopting the above technical solution, the sucking disk plays a role of fixation in the charging process or idle process of the charger.

Preferably, the portable charger is provided with a controller, the controller is arranged inside the shell, and the controller is provided with a control switch.

By adopting the above technical solution, the control switch can control the charging process of the charger.

Preferably, the controller is provided with a perception device.

By adopting the above technical solution, the perception device enables the ambient environment to be measured in the charging process of the charger, to prevent the charging process from being destroyed due to close proximity of external objects in the charging process of the charger.

Preferably, the portable charger is provided with a connecting system, the connecting system is provided with a charger connector, the charger connector is provided with a charging gun, and the charging gun is provided with a locking device.

By adopting the above technical solution, the charging gun is tightly connected with the electric vehicle by the locking device, increasing the charging speed.

Preferably, the portable charger is also provided with an emergency device, and the emergency device is provided with a power storage unit.

By adopting the above technical solution, the power storage unit in the emergency device enables the charger to directly discharge the electric vehicle in emergency circumstances, and is used as a charge pal for the electric vehicle.

Preferably, the emergency device is provided with a selection switch.

By adopting the technical solution, the purpose of providing the selection switch is to enable the charger to select switching in the two modes, i.e. charging of the connecting system and power supply of the power storage unit.

Preferably, the power storage unit is configured into a capacitor.

By adopting the above technical solution, since the discharge current of the capacitor belongs to direct current, with respect to an alternating current charger, the charging speed is faster, and in addition, the capacitor has the characteristics of environmental protection and no pollution as compared with a storage battery.

Compared with the prior art, the present invention has the advantages that: (1) cables may be tidily fixed to the shell, so that cables may be tidily twined and fixed, reducing the space occupied by the charger; (2) the charger may be fixed; (3) the ambient environment in the charging process of the charger may be perceived; and (4) the discharge process may be realized by the capacitor in emergency circumstances.

In the figures: 1—Shell; 101—Half shell; 2—Controller; 3—Cable placing ring; 4—Hook; 5—Placing cover; 6—Connecting piece; 7—Sucking disk; 8—Control switch; 801—Electromagnetic relay; 9—Perception device; 901—Displacement sensor; 902—Buzzer; 10—Emergency device; 11—Power storage unit; 12—Selection switch; 13—Power supply connector; 1301—Cable; 1302—Charging plug; 14—Charger connector; 1401—Charging gun; 15—Locking device; 1501—Mechanical lock; 1502—Button; 1503—Snapping hook; 16—Chute; 17—Flange; 18—Integrated chip; 19—Data processing system; 1901—Data collection system; 1902—Recognition system; 20—Protection system; 2001—Lightning protection circuit; 2002—Overcurrent protection circuit; 2003—Heat dissipation protection device; 21—Single chip microcomputer; 22—Wireless chip; 23—Connecting shaft.

DETAILED DESCRIPTION

The present invention is further described below in detail in combination with the drawings and embodiments.

Embodiment 1

Figure 1:
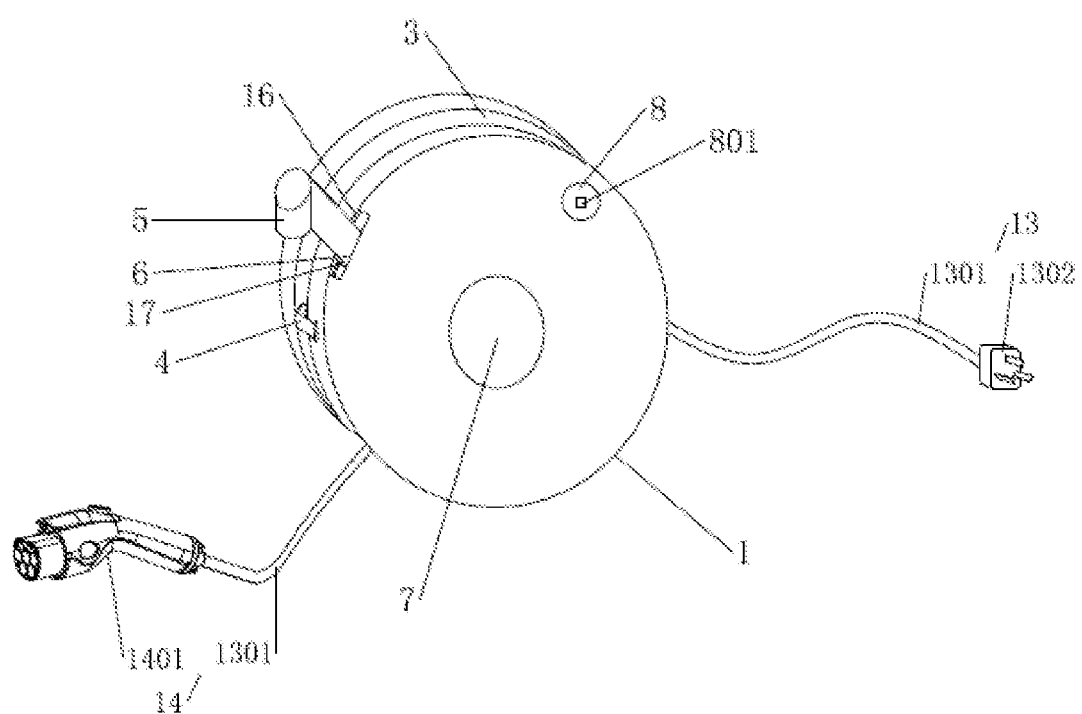
FIG. 1 is a structural schematic diagram of the present invention.
Figure 2:
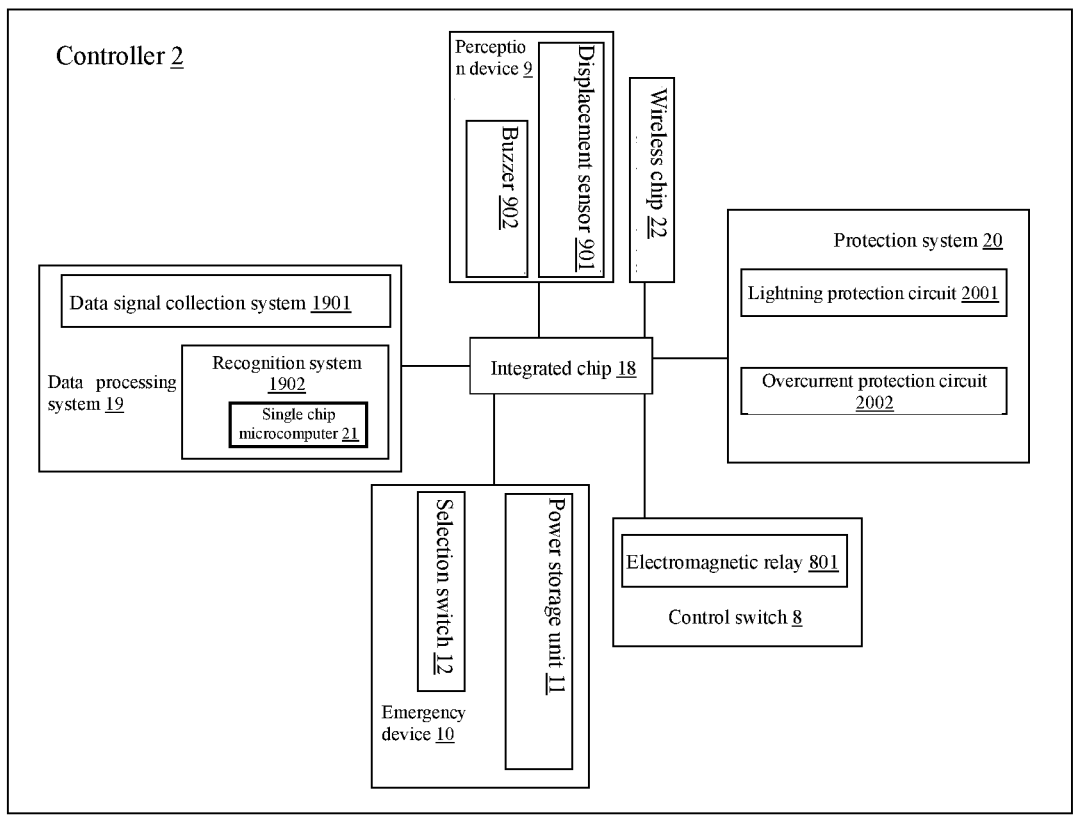
FIG. 2 is a structural schematic diagram of a charging gun.
Figure 3:
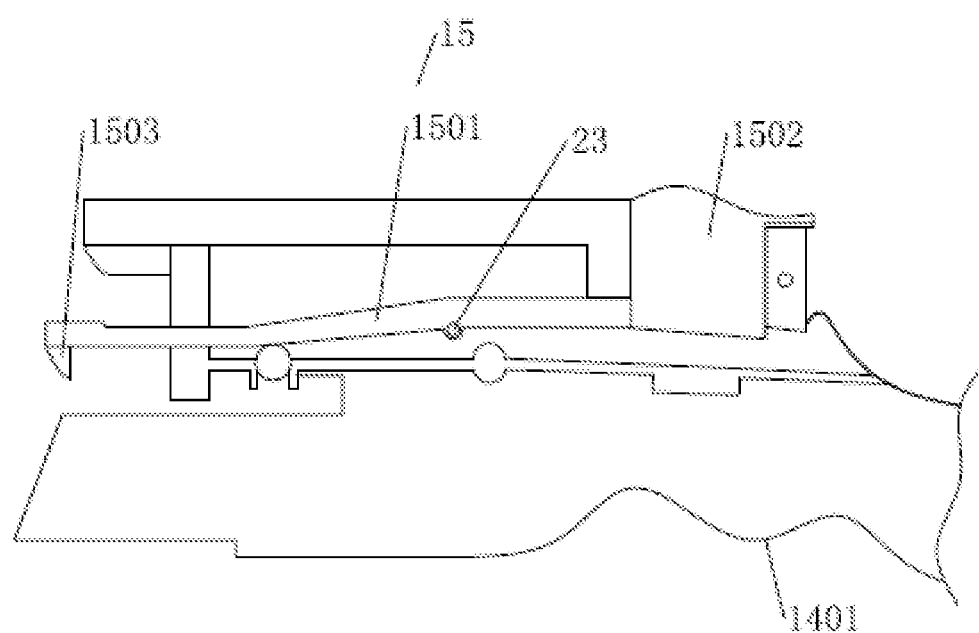
FIG. 3 is a structural schematic diagram of a controller.
Figure 4:
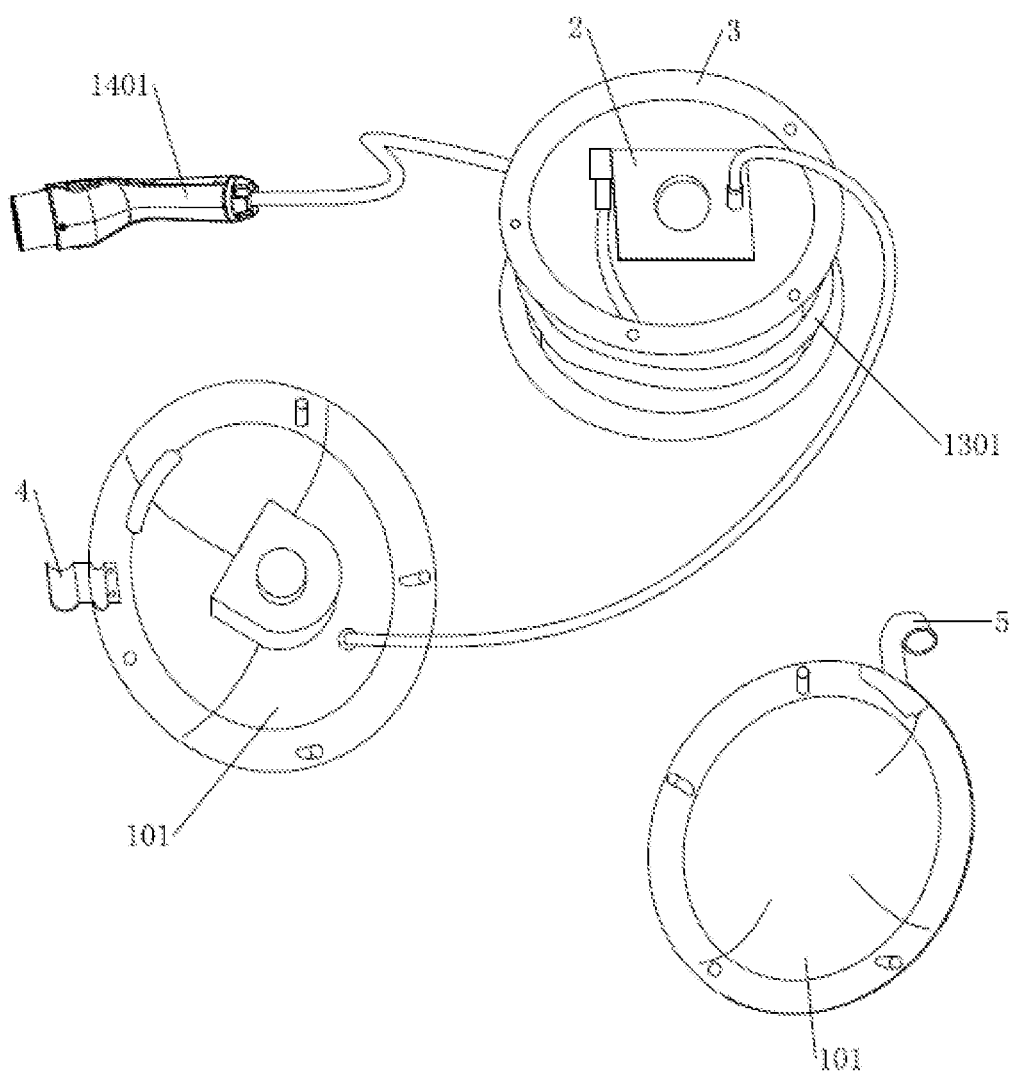
FIG. 4 is a split structural schematic diagram of a charger.

A portable intelligent charger shown in FIG. 1 to FIG. 4, having a body comprising a shell 1, a connecting system arranged on both sides of the shell 1, and a controller 2 arranged inside the shell 1, wherein the connecting system comprises a power supply connector 13 and a charger connector 14, wherein the power supply connector 13 is composed of a cable 1301 and a charging plug 1302, and the charging plug 1302 is electrically connected with the controller 2 by the cable 1301, realizing the power supply process of the charger; the charger connector 14 is composed of a cable 1301 and a charging gun 1401, and the charging gun 1401 is electrically connected with the controller 2 by the cable 1301, realizing the connection between the charger and the electric vehicle. Thus, an electrical signal of the charging plug 1302 passes through the cable 1301 and the controller 2, completing the process of charging the electric vehicle.

The charging gun 1401 of the charger connector 14 is provided with a locking device 15, the locking device 15 comprising a mechanical lock 1501, a button 1502 and a snapping hook 1503 arranged at one end of the mechanical lock 1501, wherein the mechanical lock 1501 of the locking device 15 is rotated in the peripheral direction of a connecting shaft 23 by the connecting shaft 23, the mechanical lock 1501 is arranged on the upper part of the charging gun 1401, the snapping hook 1503 is arranged at the front end of the mechanical lock 1501, and the button 1502 is arranged at the rear end of the mechanical lock 1501. In the process of connecting the charging gun 1401 with the electric vehicle, the button 1502 is pressed, so that the end of the mechanical lock 1501 provided with the button 1502 is moved downwards, and meanwhile, the end of the mechanical lock 1501 provided with the snapping hook 1503 is moved upwards; the button 1502 is released, so that the tip of the charging gun 1401 is tightly clamped at the lithium battery interface of the electric vehicle by the snapping hook 1503, to avoid the phenomenon that the charging gun 1401 is not tightly connected in the charging process, which may affect the charging speed.

In this embodiment, the shell 1 is configured to be spliced by two circular half shells 101, a cable placing ring 3 is arranged between the two half shells 101, the cable placing ring 3 is connected with the two half shells 101 by bolts respectively, the cable placing ring 3 has a diameter less than that of the shell 1, one side of the cable placing ring 3 is provided with a hook 4, and the hook 4 is fixedly connected to the shell 1, so that the cables 1301 can be retracted and twined along the outer contour of the cable placing ring 3, and after twining, the cable 1301 of the outermost layer is hooked by the hook 4 fixedly connected to the shell 1, so that the cables 1301 are tidily twined and fixed, solving the problem that the cables 1301 are messy and easy to twine, reducing the overall space occupied by the charger.

In this embodiment, the shell 1 is preferably plastic sealed by silica gel, to prevent water and other flowing liquid from entering inside the shell 1 to affect the service life of the internal structure of the charger.

One side outer wall of the shell 1 is provided with a placing cover 5, and the placing cover 5 directly faces the cable placing ring 3 and is arranged at one side of the hook 4. The purpose of arranging the placing cover 5 is to store the charging gun 1401 of the charger connector 14 in the placing cover 5 after the connecting system is retracted and twined, to prevent same from being polluted by the ambient environment in the process of storage, thereby having a protection effect on the charging gun 1401.

In addition, a connecting piece 6 is arranged between the placing cover 5 and the shell 1, the placing cover 5 is slidably connected with the shell 1 by the connecting piece 6, the specific structure is as follows: the connecting piece 6 is integrated with the placing cover 5 in one piece and is fixedly connected with a flange 17 at the lower part, the flange 17 is arranged inside the shell 1, the inner side wall of the shell 1 is provided with an end chute 16 in the contour direction thereof, the chute 16 being an inverted T-shaped chute, and the flange 17 is snap-fitted in the chute 16, thereby sliding the placing cover 5 in the length direction of the chute 16. In the twining process of the cables 1301, when the pulling forces on one ends thereof are different, because there is a gap between the cables 1301, the end of the cable 1301 provided with the charging gun 1401 is located at different position, and the charging gun 1401 and the placing cover 5 can be fastened as well by pulling the placing cover 5.

In this embodiment, the bottom surface of the shell 1 is provided with a sucking disk 7, and the sucking disk 7 is fixedly connected to the shell 1, so that the charger can eliminate air in the sucking disk 7 to realize the fixing effect in the charging process or non-charging process of the charger. The sucking disk 7 can be fixed to the body or floor of the electric vehicle according to actual conditions, solving the problem of potential safety hazard existing in the daily life due to suspension charging of the charger.

In this embodiment, the controller 2 of the charger comprises an integrated chip 18, a data processing system 19 and a protection system 20, wherein the data processing system 19 and the protection system 20 are connected with the integrated chip 18 by circuits. The integrated connection of circuits and information transmission are realized by the integrated chip 18; the data processing system 19 comprises a data information collection system 1901 and a recognition system 1902, wherein a single chip microcomputer 21 is arranged in the recognition system 1902 for judgment of data; the protection system 20 comprises a lightning protection circuit 2001 and an overcurrent protection circuit 2002 for outside weather protection and internal voltage current protection of the charger. After the charging gun 1401 of the charger connector 14 is connected with a storage battery interface of the electric vehicle, and the charging plug 1302 of the power supply connector 13 is connected with the socket, current and signal are transmitted. A collected electrical signal is transmitted to the integrated chip 18 by the data information collection system 1901 of the controller 2 and is transferred to the single chip microcomputer 21 of the recognition system 1902 after flowing through integrated chip 18, the charging current is divided into high-speed charging current, intermediate-speed charging current and low-speed charging current using the programming content of the single chip microcomputer 21, and the transferred electrical signal is compared with same, to judge the present charging state of the electric vehicle to prevent the electric vehicle from being in a high-voltage state for a long time, thereby realizing the process of charging in sections according to the actual state of the electric vehicle, and prolonging the service life thereof.

A wireless chip 22 is arranged in the controller 2, the wireless chip 22 is integrated and electrically connected with the integrated chip 18, to realize signal transmission between the wireless chip and the integrated chip 18, the charger is wirelessly connected with an intelligent terminal by arranging the wireless chip 22, and the charging state of the charger is monitored by an intelligent terminal such as a cell phone, computer, etc., thereby increasing the security thereof.

In this embodiment, the controller 2 is provided with a control switch 8, the control switch 8 is arranged at one side of the shell 1 and is electrically connected to the integrated chip 18, and an electromagnetic relay 801 is arranged in the control switch 8 here. If data displayed on the above intelligent terminal is exceptional, an exceptional signal is transmitted to the integrated chip 18, and the exceptional signal is fed back to the electromagnetic relay 801 of the control switch 8 by the integrated chip 18, so that the electromagnetic relay 801 is in a disconnection state, thereby realizing the automatic control process of circuit disconnection.

One end of the lightning protection circuit 2001 is connected with the live line of the circuit, and the other end thereof is connected with the neutral line, thus forming the lightning protection circuit 2001, avoiding the damage of the charger and guaranteeing personal safety and vehicle safety. A gas discharge tube is arranged in the lightning protection circuit 2001. When thunder and lightning, and other exceptional shock occur in the process that the charger inputs power, an exceptional signal is transmitted by the gas discharge tube, the signal is transferred to the integrated chip 18, and the exceptional signal is fed back to the electromagnetic relay 801 of the control switch 8 by the integrated chip 18, so that the control switch 8 is disconnected to realize a protection effect.

In this embodiment, the controller 2 is further provided with a perception device 9, and the perception device 9 is electrically connected and integrated with the integrated chip 18 to detect the ambient environment of the charger. The perception device 9 comprises a displacement sensor 901 and a buzzer 902, wherein the displacement sensor 901 is preferably an ultrasonic distance measuring sensor, thus the distance between a moving object in the ambient environment in the charging process of the charger and the charger can be detected, and the value of distance in the displacement sensor 901 can be set. When the data detected by the displacement sensor 901 is smaller than the value set in the displacement sensor 901, the detected data is transmitted to the integrated chip 18 by the displacement sensor 901, and is fed back to the buzzer 902 by the integrated chip 18, so that the buzzer 902 gives an alarm sound, to remind and warm the object moving to the charger to be away from the charger, thereby effectively avoiding the interference of outside objects to the charging process of the charger.

An emergency device 10 is arranged in the portable charger, the emergency device 10 is electrically connected with the integrated chip 18 by a connecting circuit, and the electric vehicle is directly charged by the emergency device 10 through the power stored therein in emergency circumstances, effectively solving the problem that the electric vehicle has insufficient power while driving and there is no power source nearby to replenish power in time. The emergency device 10 comprises a power storage unit 11 and a selection switch 12, wherein the power storage unit 11 is used for storing power, the selection switch 12 is provided with a charging detent of charging plug and a charging detent of power storage unit, the lower end thereof respectively corresponding to corresponding connecting circuits for selecting the mode of the charger. If the electric vehicle has insufficient power while driving, the selection switch 12 is adjusted to the charging detent of power storage unit, so that the charger is in the operating process of the emergency device 10. The power storage unit 11 is connected to the connecting system by the integrated chip 18, to form a discharge pathway, so as to complete the power supply process of the electric vehicle in an emergency state. If the process of charging the electric vehicle is realized by the charger through the charging plug 1302, the selection switch 12 is shifted to the charging detent of charging plug, and then the charging plug 1302 is connected to the socket. In the process of charging using the charging plug 1302, a pathway is formed by the power storage unit 11 and the connecting circuit below the charging detent of power storage unit, and the process of charging the power storage unit 11 is completed under the action of the connecting system, thereby realizing the process of charging the power storage unit 11 while using the charging plug 1302 to charge.

In this embodiment, the power storage unit 11 is configured into a capacitor which has the characteristics of environmental protection and no pollution as compared with a storage battery and conforms to the new energy concept advocated by the society.

Embodiment 2

This embodiment is different from embodiment 1 in that: the power storage unit 11 is configured into a super capacitor, the super capacitor has the advantages of higher capacity, specific energy or capacity density, wider operating temperature range and longer service life as compared with the capacitor, thereby prolonging the service life of the emergency device of the charger.

Although preferred embodiments of the present invention are described in detail above, it should be understood that for those skilled in the art, various variations and changes can be made to the present invention. Any modification, equivalent replacement, improvement, etc. made within the spirit and the principle of the present invention shall be included within the protection scope of the present invention.

What is claimed is:

1. A portable intelligent charger, having a body provided with a shell (1),
   wherein the side wall of the shell (1) is provided with a cable placing ring (3), and one side of the cable placing ring (3) is provided with a hook (4);
   wherein the side wall of the shell (1) is provided with a placing cover (5), and the placing cover (5) directly faces the cable placing ring (3);
   wherein one side of the placing cover (5) is provided with a connecting piece (6), and the placing cover (5) is slidably connected to the shell (1) by the connecting piece (6); and
   wherein the bottom surface of the shell (1) is provided with a sucking disk (7).

2. The portable intelligent charger according to claim 1, wherein the portable charger is provided with a controller (2), the controller (2) is arranged inside the shell (1), and the controller (2) is provided with a control switch (8).

3. The portable intelligent charger according to claim 2, wherein the controller (2) is provided with a perception device (9).

4. The portable intelligent charger according to claim 1, wherein the portable charger is provided with a connecting system, the connecting system is provided with a charger connector (14), the charger connector (14) is provided with a charging gun (1401), and the charging gun (1401) is provided with a locking device (15).

5. The portable intelligent charger according to claim 4, wherein the portable charger is provided with an emergency device (10), and the emergency device (10) is provided with a power storage unit (11).

6. The portable intelligent charger according to claim 4, wherein the emergency device (10) is provided with a selection switch (12).

7. The portable intelligent charger according to claim 5, wherein the power storage unit (11) is configured into a capacitor.

\* \* \* \* \*